(12) United States Patent
Yakovlev et al.

(10) Patent No.: US 10,809,182 B2
(45) Date of Patent: Oct. 20, 2020

(54) DIFFERENTIAL POLARISATION IMAGING AND IMAGING PRECISION ELLIPSOMETRY

(71) Applicant: AGENCY FOR SCIENCE, TECHNOLOGY AND RESEARCH, Singapore (SG)

(72) Inventors: Nikolai Leopoldovich Yakovlev, Singapore (SG); Brian Liau, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 16/412,972

(22) Filed: May 15, 2019

(65) Prior Publication Data
US 2019/0353584 A1    Nov. 21, 2019

(30) Foreign Application Priority Data

May 16, 2018 (SG) .......................... 10201804131W

(51) Int. Cl.
*G01N 21/21* (2006.01)
*G01B 11/06* (2006.01)

(52) U.S. Cl.
CPC ............ *G01N 21/211* (2013.01); *G01B 11/06* (2013.01); *G01N 2021/212* (2013.01)

(58) Field of Classification Search
CPC ........... G01N 21/211; G01N 2021/212; G01B 11/06; G01J 4/04
(Continued)

(56) References Cited

U.S. PATENT DOCUMENTS

| 4,750,822 | A  | * | 6/1988 | Rosencwaig | .......... | G01N 21/17 356/432 |
| 6,753,961 | B1 | * | 6/2004 | Norton | .................... | G01J 3/447 356/364 |
| 2008/0049224 | A1 | | 2/2008 | Otsuki et al. | | |

FOREIGN PATENT DOCUMENTS

| SG | 11201609773 | 12/2016 |
| WO | WO-2015/183201 A1 | 12/2015 |

OTHER PUBLICATIONS

Jin et al., "Imaging Ellipsometry Revisited: Developments for Visualization of Thin Transparent Layers on Silicon Substrates", Review of Scientific Instruments, vol. 67, 1996, pp. 2930-2936.
(Continued)

*Primary Examiner* — Roy M Punnoose
(74) *Attorney, Agent, or Firm* — Marshall, Gerstein & Borun LLP

(57) ABSTRACT

Methods and systems for imaging precision ellipsometry of a sample are provided. The method includes shining a source of linearly polarised light on a surface of the sample wherein light reflected off the surface of the sample has elliptic polarisation. The method further includes converting polarisation of the light reflected off the surface of the sample into linear polarisation suitable for a polarisation modulator by a retarder and oscillating a polarisation modulator to measure the polarisation rotation of the polarised light passing through the retarder. In addition, the method includes synchronising acquisition of images of the light from the retarder with oscillations of the polarisation modulator to acquire first array images during positive half-periods of oscillations of the polarisation modulator and to acquire second array images during negative half-periods of the oscillations of the polarisation modulator. Finally, the method includes differential image processing of the first array images and the second array images to generate
(Continued)

difference images comprising a plurality of pixels, the value of each of the plurality of pixels in each of the difference images being proportional to the polarisation rotation of the light reaching the polarisation modulator from the sample.

21 Claims, 11 Drawing Sheets

(58) Field of Classification Search
USPC .......................................................... 356/369
See application file for complete search history.

(56) References Cited

OTHER PUBLICATIONS

Ralin et al., "Kinetic Analysis of Glycoprotein-Lectin Interactions by Label-Free Internal Reflection Ellipsometry", Clinical Proteomics, vol. 4, 2008, pp. 37-46.

Van Noort et al., "Silicon Based Affinity Biochips Viewed with Imaging Ellipsometry", Measurement Science and Technology, vol. 11, 2000, pp. 801-808.

Wang et al., "A Label-Free Multisensing Immunosensor Based on Imaging Ellipsometry", Analytical Chemistry, vol. 75 (22), 2003, pp. 6119-6123.

* cited by examiner

230

240

DIFFERENTIAL POLARISATION IMAGING AND IMAGING PRECISION ELLIPSOMETRY

PRIORITY CLAIM

This application claims priority from Singapore Patent Application No. 10201804131W filed on May 16, 2018.

TECHNICAL FIELD

The present invention generally relates to ellipsometry, and more particularly relates to differential polarisation imaging and imaging precision ellipsometry.

BACKGROUND OF THE DISCLOSURE

Ellipsometry is an optical technique for investigating properties of a sample by measuring a change of polarisation upon reflection or transmission from the sample. Ellipsometry can be used to characterize composition, thickness (depth) and other material properties of the sample and can be sensitive to a change in the optical response of incident radiation that interacts with the sample being investigated.

However, conventional implementations of imaging ellipsometry use high powered, bulky and expensive Xenon lamps to generate the radiation which interacts with the sample. In addition, most conventional ellipsometers lack the sensitivity required for real-time molecular interaction analysis, and may provide information about a sample interaction between only one ligand-receptor molecular pair at a time.

Surface plasmon resonance (SPR) devices provide a less bulky implementation which can provide sensitive characterizations. Typical SPR devices, however, require expensive gold substrates making such conventional SPR devices costly and difficult to cleanse after use as the gold substrates require laborious regeneration procedures between use to remove previously-bound analytes.

Thus, what is needed is a low-cost, sensitive ellipsometry method and system with a small footprint for point-of-care applications. Furthermore, other desirable features and characteristics will become apparent from the subsequent detailed description and the appended claims, taken in conjunction with the accompanying drawings and this background of the disclosure.

SUMMARY

According to at least one embodiment of the present invention, a method for imaging precision ellipsometry of a sample is provided. The method includes shining a source of linearly polarised light on a surface of the sample wherein light reflected off the surface of the sample has elliptic polarisation. The method further includes converting polarisation of the light reflected off the surface of the sample into linear polarisation suitable for a polarisation modulator by a retarder and oscillating a polarisation modulator to measure the polarisation rotation of the polarised light passing through the retarder. In addition, the method includes synchronising acquisition of images of the light from the retarder with oscillations of the polarisation modulator to acquire first array images during positive half-periods of oscillations of the polarisation modulator and to acquire second array images during negative half-periods of the oscillations of the polarisation modulator. Finally, the method includes differential image processing of the first array images and the second array images to generate difference images comprising a plurality of pixels, the value of each of the plurality of pixels in each of the difference images being proportional to the polarisation rotation of the light reaching the polarisation modulator from the sample.

According to another embodiment of the present invention, a method for imaging ellipsometry is provided. The method includes generating a laser beam and rastering the laser beam in a first direction and a second direction to generate a rastered laser beam of linearly polarised light, the first direction being perpendicular to the second direction. The method further includes directing the rastered laser beam of linearly polarised light onto a surface of a sample to illuminate a required area of the sample and reflect elliptically polarised light off the surface of the sample for imaging ellipsometry of the sample.

According to a further embodiment of the present invention an imaging ellipsometry system for generating a polarisation image in response to elliptically polarised light reflected off a surface of a sample is provided. The system includes an illumination system, a quarter wavelength retarder, a polarisation modulator, an imaging device, a synchronising circuit and a computer. The illumination system generates linearly polarised light and directs the linearly polarised light onto the surface of the sample. The quarter wavelength retarder converts reflected elliptically polarised light into linearly polarised light having a direction of polarisation rotated by an angle proportional to an ellipticity of the reflected light. The polarisation modulator generates an oscillating component of an intensity of the reflected light, wherein a difference between intensities of the reflected light during a first half-period and during a second half-period of the oscillation depends on a direction of polarisation of light passing through the retarder. The imaging device images an illuminated area of the surface of the sample using reflected light. The synchronising circuit is coupled to the imaging device and the polarisation modulator and synchronises imaging of the reflected linear polarised light with oscillations of the polarisation modulator to image first and second array images. And the computer is coupled to the imaging device for differential imaging processing of the first and second array images to generate a polarisation image comprising a plurality of pixels, a value of each of the plurality of pixels of the polarisation image being proportional to the ellipticity of the reflected light.

According to yet another embodiment of the present invention an imaging ellipsometry system for generating a polarisation image in response to linear polarised light reflected off a surface of a sample is provided. The system includes a laser and a laser beam rastering device. The laser generates a laser beam and the laser beam rastering device rasters the laser beam in a first direction and a second direction to generate a rastered laser beam of linear polarised light, wherein the first direction is perpendicular to the second direction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

FIG. 1, comprising FIGS. 1A and 1B, depicts a schematic diagram and a photographic image of a system for imaging precision ellipsometry in accordance with present embodiments, wherein FIG. 1A depicts a schematic diagram of the hardware for the imaging precision ellipsometry system and FIG. 1B depicts a photographic image of the hardware for the imaging precision ellipsometry system.

FIG. 2, comprising FIGS. 2A to 2D, depicts laser beam rastering in the imaging precision ellipsometry system in accordance with the present embodiments, wherein FIG. 2A depicts a schematic diagram of a laser beam rastering assembly, FIG. 2B depicts a photographic image of the laser beam rastering assembly, FIG. 2C depicts a magnified image of a microarray taken with laser beam rastering and FIG. 2D depicts a magnified image of the microarray taken without laser beam rastering.

FIG. 3, comprising FIGS. 3A and 3B, depicts polarisation modulation in the imaging precision ellipsometry system in accordance with the present embodiments, wherein FIG. 3A depicts a pictorial representation of the principle of polarisation modulation used to measure polarisation rotation in accordance with the present embodiments and FIG. 3B depicts a pictorial representation of polarisation modulation and differential imaging in accordance with the present embodiments.

FIG. 6, comprising FIGS. 6A, 6B and 6C, depicts binding of Aleuria Aurantia Lectin to a printed glycan microarray as detected by the imaging precision ellipsometry system in accordance with the present embodiments, wherein FIG. 6A is an image of the printed glycan microarray before hybridization with the Aleuria Aurantia Lectin, FIG. 6B is an image of the printed glycan microarray after hybridization with the Aleuria Aurantia Lectin, and FIG. 6C is a graph of binding thickness over time of binding signals extracted by the imaging precision ellipsometry system.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present a low-cost, light, portable, small footprint ellipsometry system for point-of-care applications which uses cheap and plentiful single-use substrates for samples rather than single-use microfluidic chips. The ellipsometry system and method in accordance with present embodiments is sensitive enough to observe the accumulation of single organic molecule layers and can therefore be used for real-time, label-free affinity measurements because it incorporates the use of an external periodic stimulus to modulate the polarisation of reflected light representing a sample's image, significantly increasing the sensitivity of detection to changes in thickness on the surface of the samples. In accordance with such methods and systems, the sample's image is recorded by a video camera whose frame rate is synchronised with the oscillations of a polarisation modulator in order to obtain polarisation images, which in turn enables calculation of a thickness map of molecular layers for real-time quantitative measurement of molecular interactions, enabling measurement of the affinity of one target molecule to several receptors immobilised on a reflective substrate.

Figure 1A:
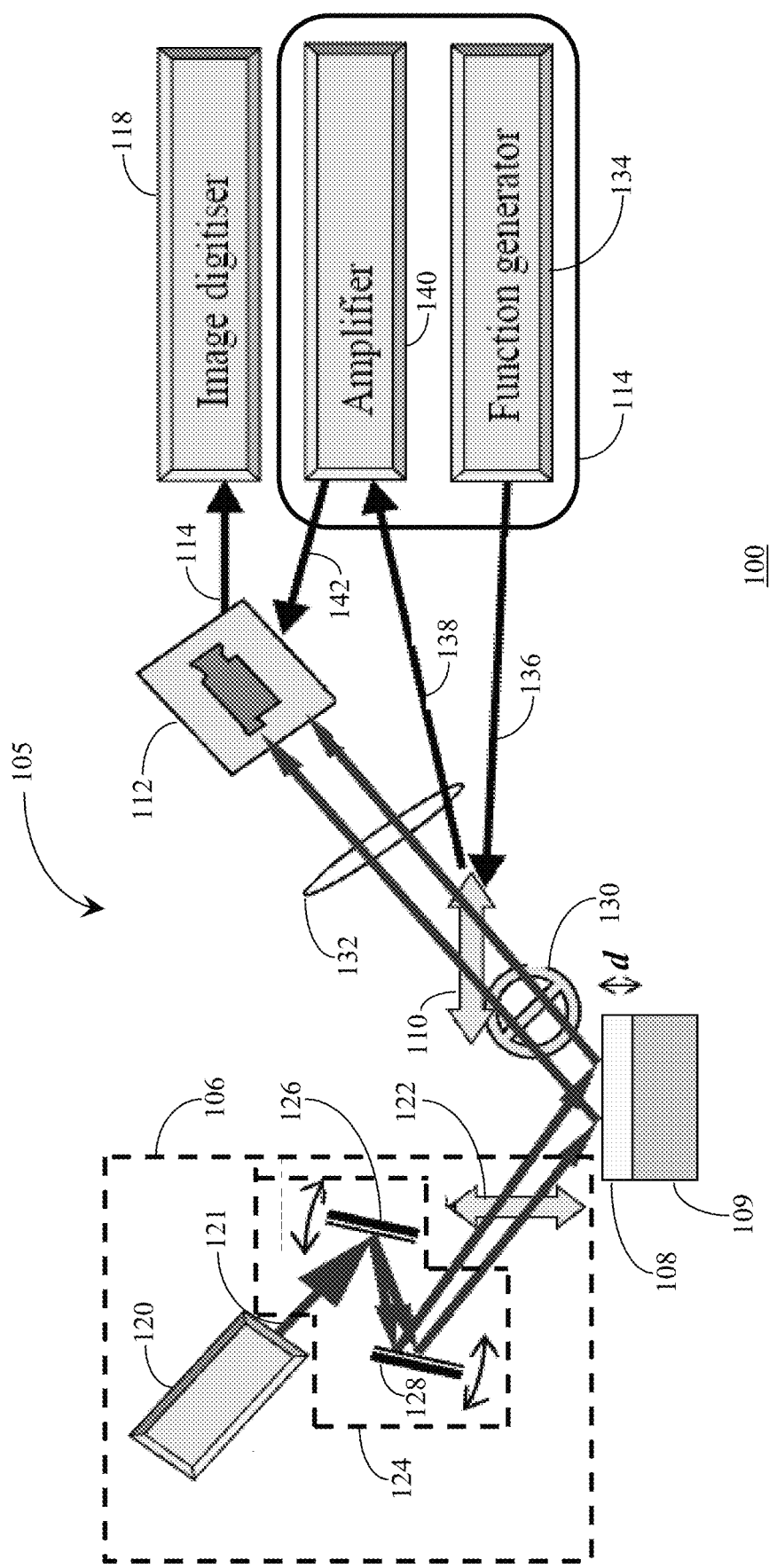
Figure 1B:
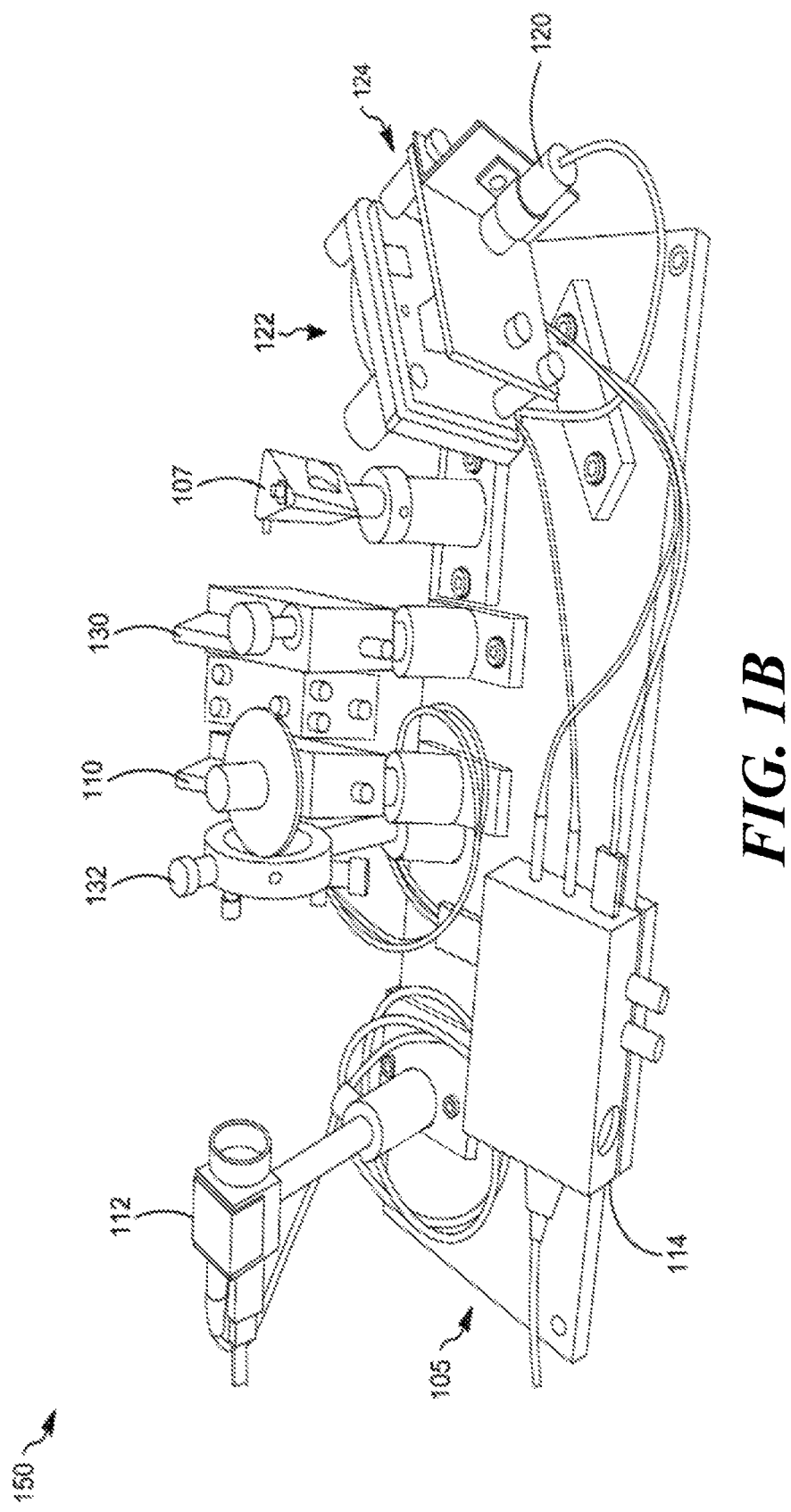

Referring to FIGS. 1A and 1B, a schematic diagram 100 (FIG. 1A) and a photographic image 150 (FIG. 1B) depict a system 105 for imaging precision ellipsometry in accordance with present embodiments. The imaging precision ellipsometry system 105 includes an illumination system 106, an opto-fluidic cuvette 107 (FIG. 1B) within which a sample 108 is placed on a reflective substrate 109, a polarisation modulator 110, a digital video camera 112, a synchronising circuit 114 which triggers image acquisition in phase with oscillation of the modulator 110 and a computer (not shown) which receives a digitized image of a surface of the sample from an image digitizer 118 coupled to the digital video camera 112.

The illumination system 106 generates linearly polarised light and includes a laser 120 for generating a laser beam 121, a polariser 122 for linearly polarising the laser beam, and a rastering assembly 124 having a first raster mirror 126 and a second raster mirror 128 for rastering the laser beam of linearly polarised light over a surface of the sample 108 to generate a rastered area of radiation on the surface of the sample 108 for reflection from the reflective substrate 109 on which the sample is placed. In accordance with the present embodiments, the reflective substrate 109 is a low cost single-use substrate such as an oxidized silicon substrate.

The rastering assembly 124 directs an area of the linearly polarised radiance onto the surface of the sample 108 in the opto-fluidic cuvette 107. A quarter wavelength retarder 130 converts elliptically polarised light reflected from the surface of the sample 108 into linearly polarised light having a direction of polarisation rotated by an angle proportional to an ellipticity of the reflected light. The polarisation modulator 110 generates an oscillating component of an intensity of the reflected light, wherein a difference between intensities of the reflected light during a first half-period of the oscillation and during a second half-period of the oscillation depends on a direction of polarisation of light passing through the retarder 130. A lens 132 focuses the reflected light onto an imaging device such as the digital video camera 112 which images an illuminated area of the surface of the sample 108 using the reflected light.

The synchronising circuit 114 includes a function generator 134 which generates a driving voltage 136 for the modulator 110. A feedback signal 138 from the modulator 110 is amplified by an amplifier 140 of the synchronising circuit 114 to generate a synchronisation signal 142 to the digital video camera 112 to synchronise imaging of the reflected linear polarised light with oscillations of the polarisation modulator for imaging first and second array images of the sample 108, the digital video camera 112 outputting an image signal 144 to an image digitizer 118. As discussed in more detail later, the computer is coupled to the image digitizer 118 for differential imaging processing of the first and second array images to generate a polarisation image comprising a plurality of pixels, a value of each of the plurality of pixels of the polarisation image being proportional to the ellipticity of the light reflected from the surface of the sample 108.

Figure 2A:
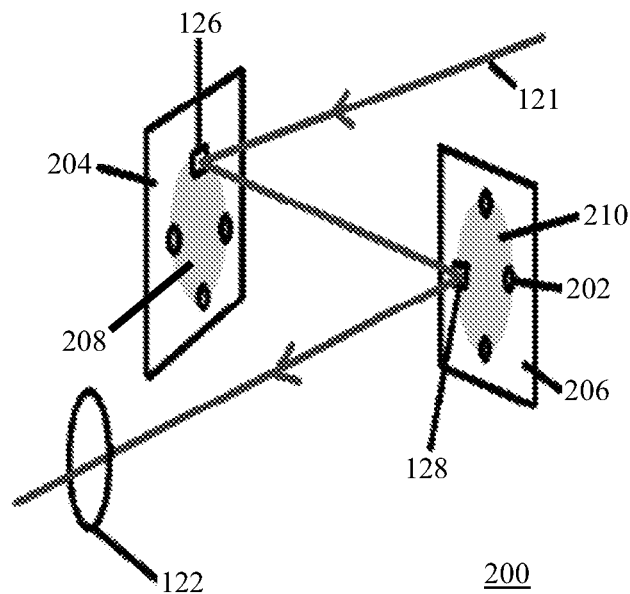
Figure 2B:
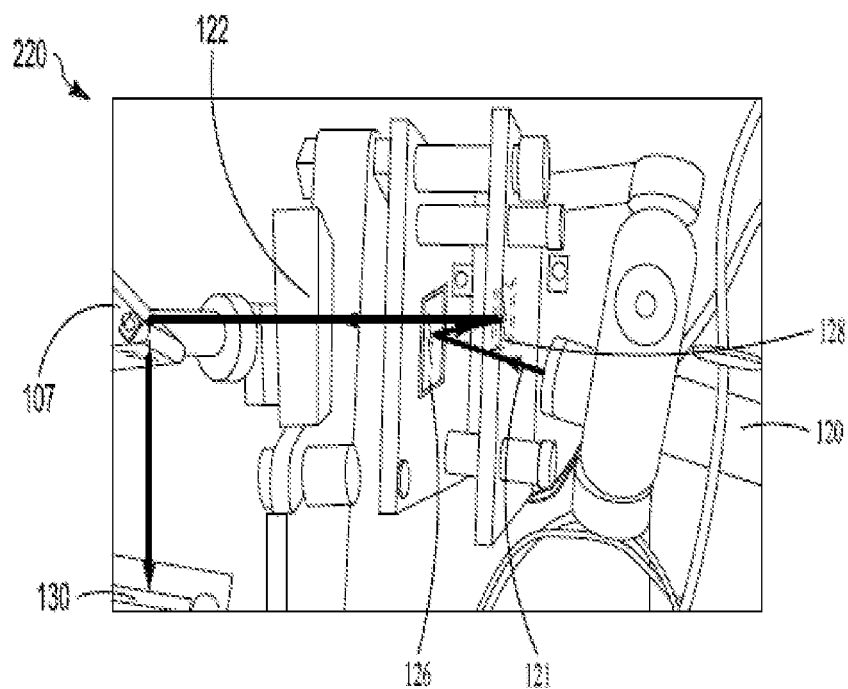

While a light emitting diode (LED) can provide a non-coherent and divergent light beam with twice as much lower light intensity at a detector than a laser, the LED consumes twice as much power as laser. However, the coherent beam from the laser generates speckles in images at the detector which are unacceptable because imaging in accordance with the present embodiments requires uniform illumination. For uniform illumination at the surface of the sample 108 with the laser beam 121, the light beam rastering assembly 124 includes the two mirrors 126, 128 oscillating in perpendicular directions at different frequencies. Referring to FIGS. 2A and 2B, a schematic diagram 200 and a photographic image 220 depict the laser beam rastering assembly 124 in accordance with the present embodiments. The schematic illustration 200 depicts each mirror 126, 128 reflecting the laser beam 121. Each mirror 126, 128 is attached to piezoelectric actuators 208, 210, which are mounted on acrylic boards 204, 206, respectively, using screws 202. An AC voltage applied to the actuators 208, 210 induces tilting oscillation of the mirrors 126, 128 to raster the laser beam 121. The first raster mirror 126 rasters the laser beam in a first direction (e.g., vertical Y-direction) and the second raster mirror 128 rasters the laser beam in a second direction (e.g., horizontal X-direction) to generate the rastered area of laser beam on the surface of the sample 108, the first direction and the second direction being perpendicular to each other. The oscillation frequency of the raster mirrors 126, 128 is as high as necessary to cover the surface of the sample 108 several times during acquisition of one image.

Figure 2C:
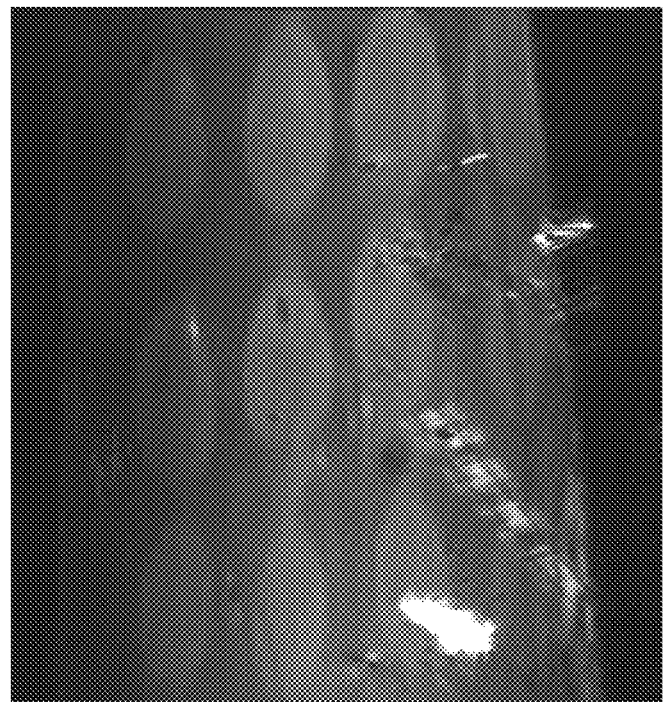
Figure 2D:
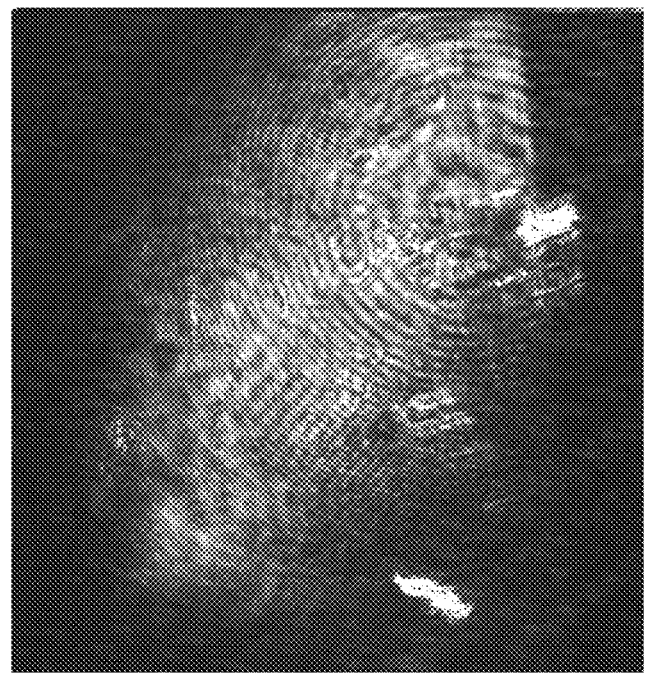

Referring to FIGS. 2C and 2D, magnified images 230, 240 of a microarray taken are depicted with and without laser beam rastering. In can be seen that rastering the laser beam results in uniform illumination in the rastered illuminated image 230, while imaging without rastering results in an image 240 with speckles.

Turning to the modulation system, when linear polarised light reflects off the reflective substrate 109 with the sample having a thickness d placed thereon, the reflected polarisation is elliptic with phase shift Δ between s- and p-components. The phase shift Δ is proportional to the thickness d of the sample 108. The quarter wavelength (Δ/4) retarder 130 converts the ellipticity into polarisation rotation γ in accordance with Equation 1:

$$\gamma = \Delta \cdot \sin \psi \cdot \cos \psi \quad (1)$$

where ψ is the angle between a long axis of the ellipsis of the reflected polarisation and the plane of the sample 108. From the equation (1), it follows that the polarisation rotation γ is proportional to the thickness d of the sample 108. The rotation γ is measured in accordance with the present embodiments using the polarisation modulator 110, which creates an alternating current (AC) component in the light intensity transmitted through the modulator 110, so that the AC amplitude is proportional to the polarization rotation γ.

Figure 3A:
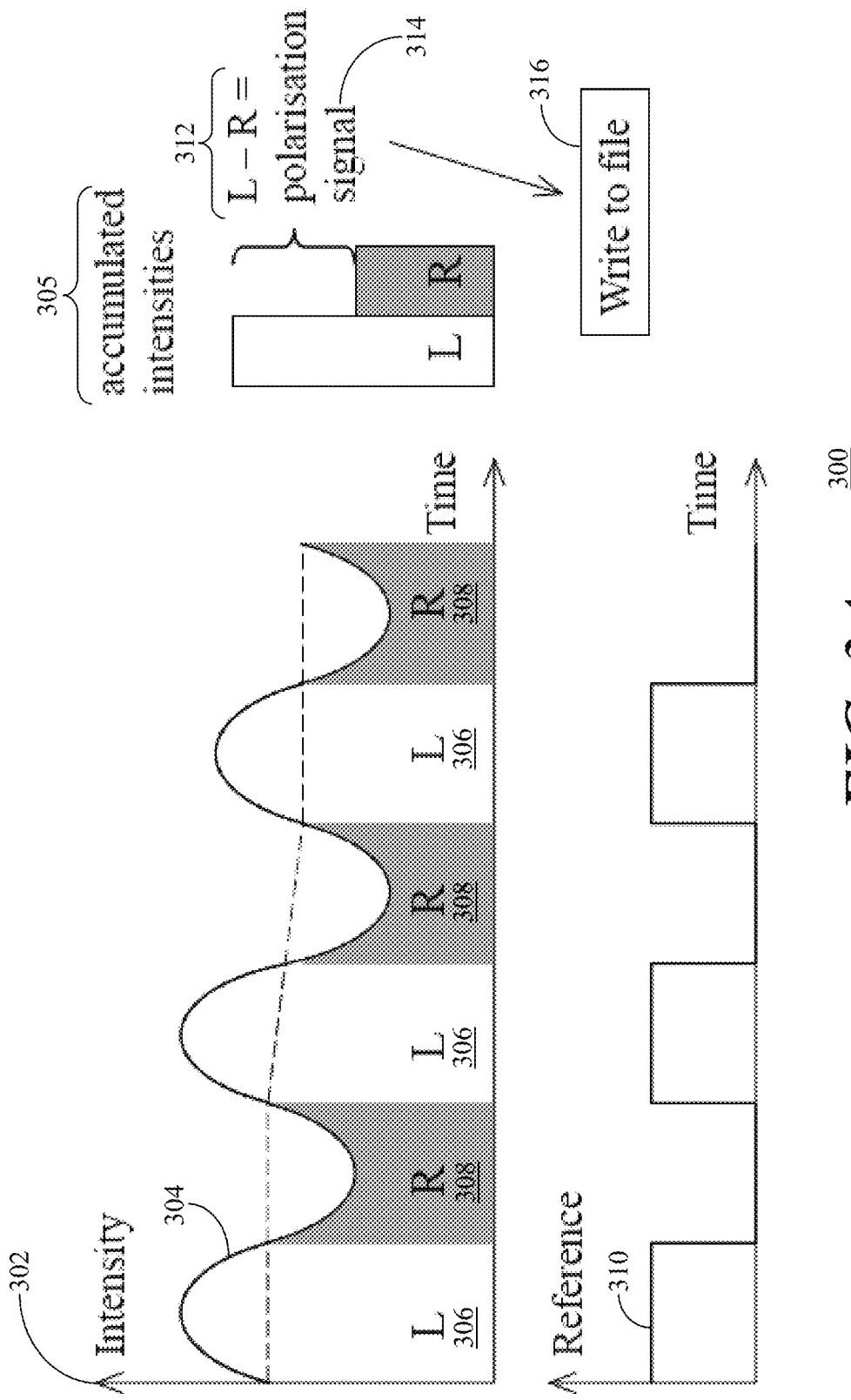

FIG. 3A depicts a schematic illustration 300 of the principle of polarisation modulation to measure polarisation rotation γ utilized by the present embodiments. To extract an amplitude 302 of an AC component of a signal 304 from a detector, a phase-lock amplifier is used. It accumulates 305 intensities 302 of left half-periods 306 and right half-periods 308 synchronously with a reference input signal 310 and subtracts them 312. This differential signal 314 is proportional to the polarization rotation γ and is then recorded by a computer by writing 316 to a file.

Figure 3B:
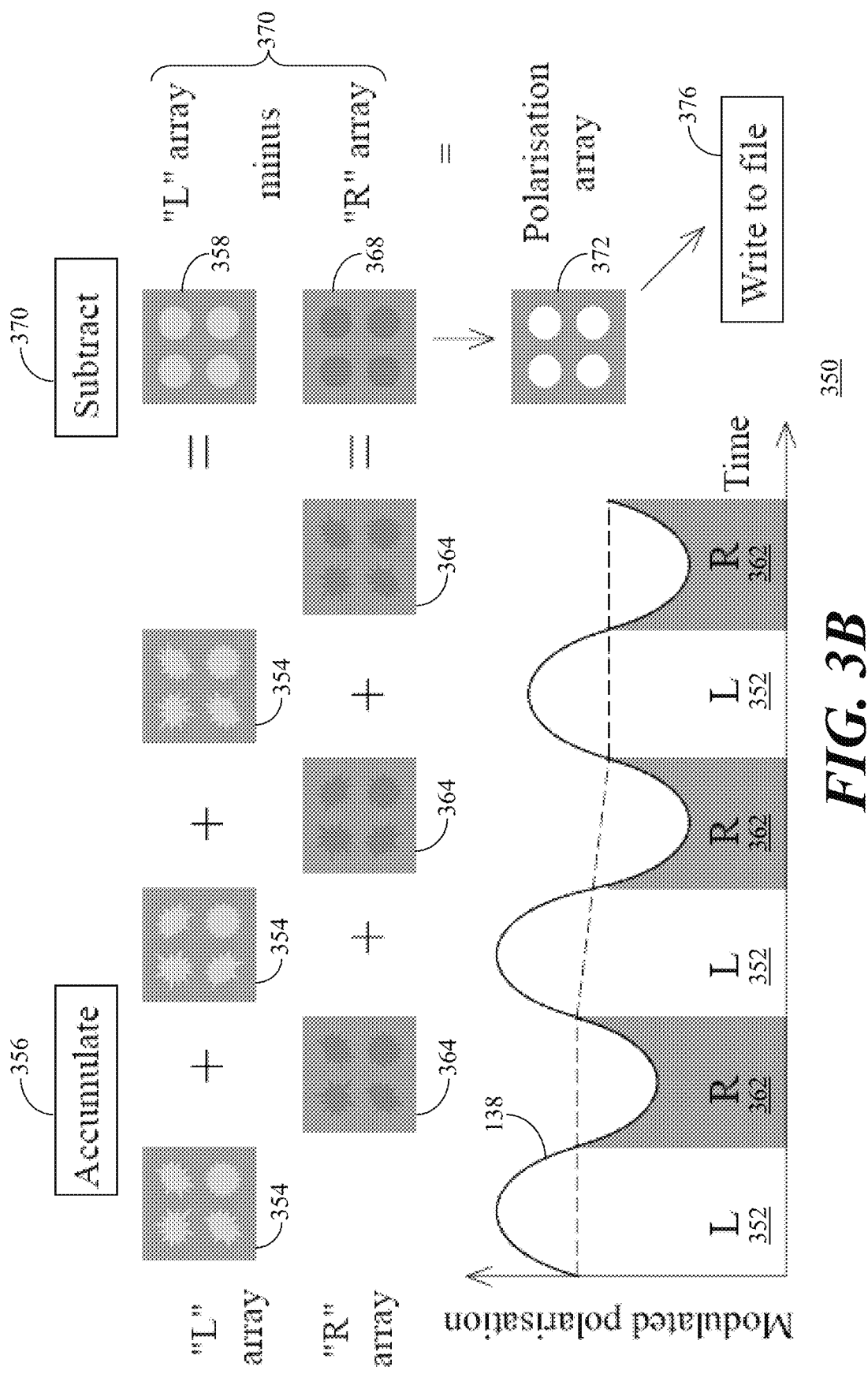

FIG. 3B depicts a schematic illustration 350 of measuring polarisation rotation in precision ellipsometry imaging in accordance with the present embodiments. To measure polarisation rotation, the digital video camera 112 takes images in phase with oscillations of the polarisation modulator 110. The feedback signal 138 from the modulator 110 is amplified by the amplifier 140 and provided as the synchronisation signal 142 to the digital video camera 112. When the modulator 110 turns left 352, the camera 112 takes a "left" image 354 which is digitized by the image digitizer 118. The computer coupled to the image digitizer 118 accumulates 356 the "left" image 354 in a "left" array 358. Similarly, when the modulator 110 turns right 362, the digital video camera 112 takes a "right" image 364 and the computer accumulates 356 the "right" image in a "right" array 368. Subtraction 370 of the "right" array 368 from the "left" array 358 by the computer is termed differential imaging and provides a polarisation array 372. The differential signal 374 of the polarisation array 372 is then recorded by the computer by writing pixel values of the polarization array 372 to a file 376, where the pixel values are proportional to the polarization rotation γ of light reaching those pixels.

Figure 4:
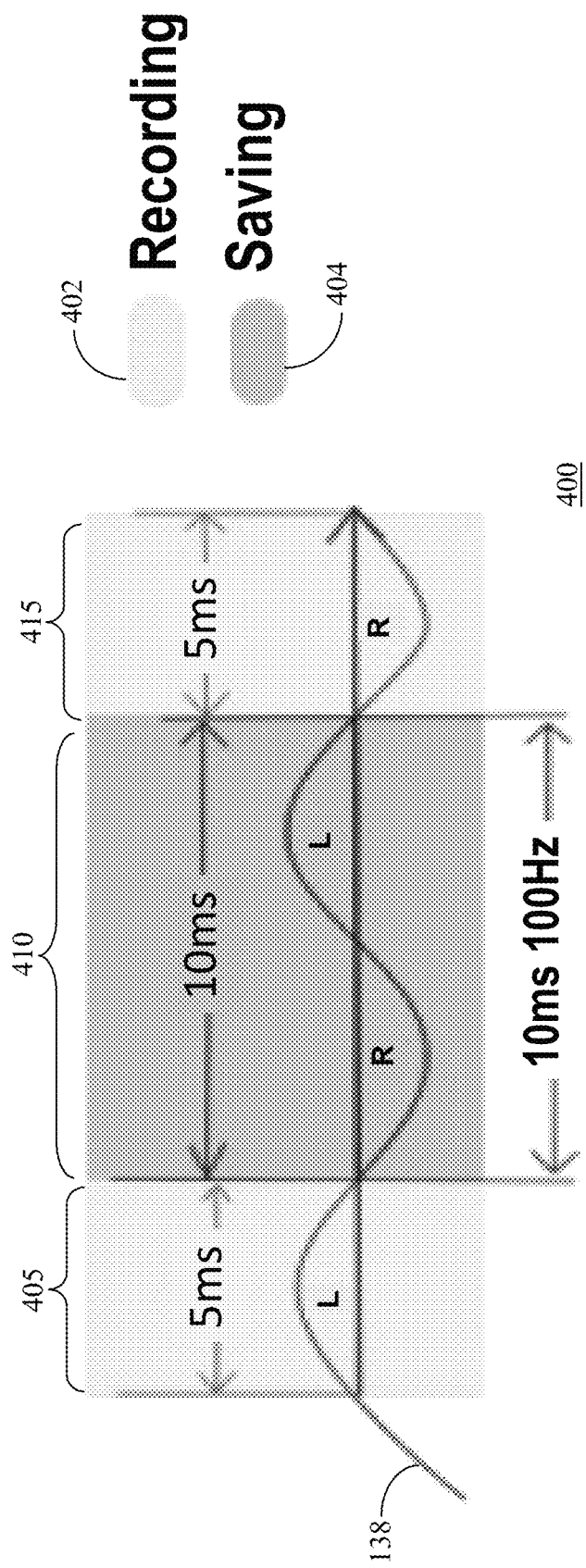
FIG. 4 depicts a pictorial representation of a duty cycle for image acquisition synchronisation in accordance with the present embodiments.

To synchronise image acquisition with oscillations of the modulator 110, the feedback signals 138 from sensing piezo-transducers installed in the modulator 110 goes to the amplifier 140, which forms strobes (the synchronisation signal 142) recognized by the digital video camera 112. Referring to FIG. 4, a schematic illustration 400 depicts the synchronisation duty cycle of image acquisition in accordance with the present embodiments. As the modulator 110 oscillates, the feedback signal 138 is generated by signals from the sensing piezo-transducers installed in the modulator 110. Assuming it takes approximately one full cycle of the oscillations of the modulator 110 for the digital video camera 112 to save data to the computer, image acquisition is synchronised with the oscillations of the modulator such that when the modulator 110 turns left, the camera 112 takes 402 a "left" image during a half cycle 405, then saves 404 data during full cycle 410, which by that time the modulator 110 turns right and the camera 112 takes 402 a "right" image during the next half cycle 415

Thus, if the digital video camera 112 in accordance with the present embodiments has an acquisition rate of 100 frames per second (fps) and spends around 10 milliseconds (ms) to save data to the computer, the modulator 110 should be designed so that it has a frequency of approximately 89 Hz in order to satisfy the duty cycle of image acquisition depicted in the schematic illustration 400: when the modulator 110 turns left, the digital video camera 112 takes 402 a "left" image during 5 ms, then saves 404 data during 10 ms, which by that time the modulator 110 has turned right and the camera takes 402 a "right" image.

Figure 5:
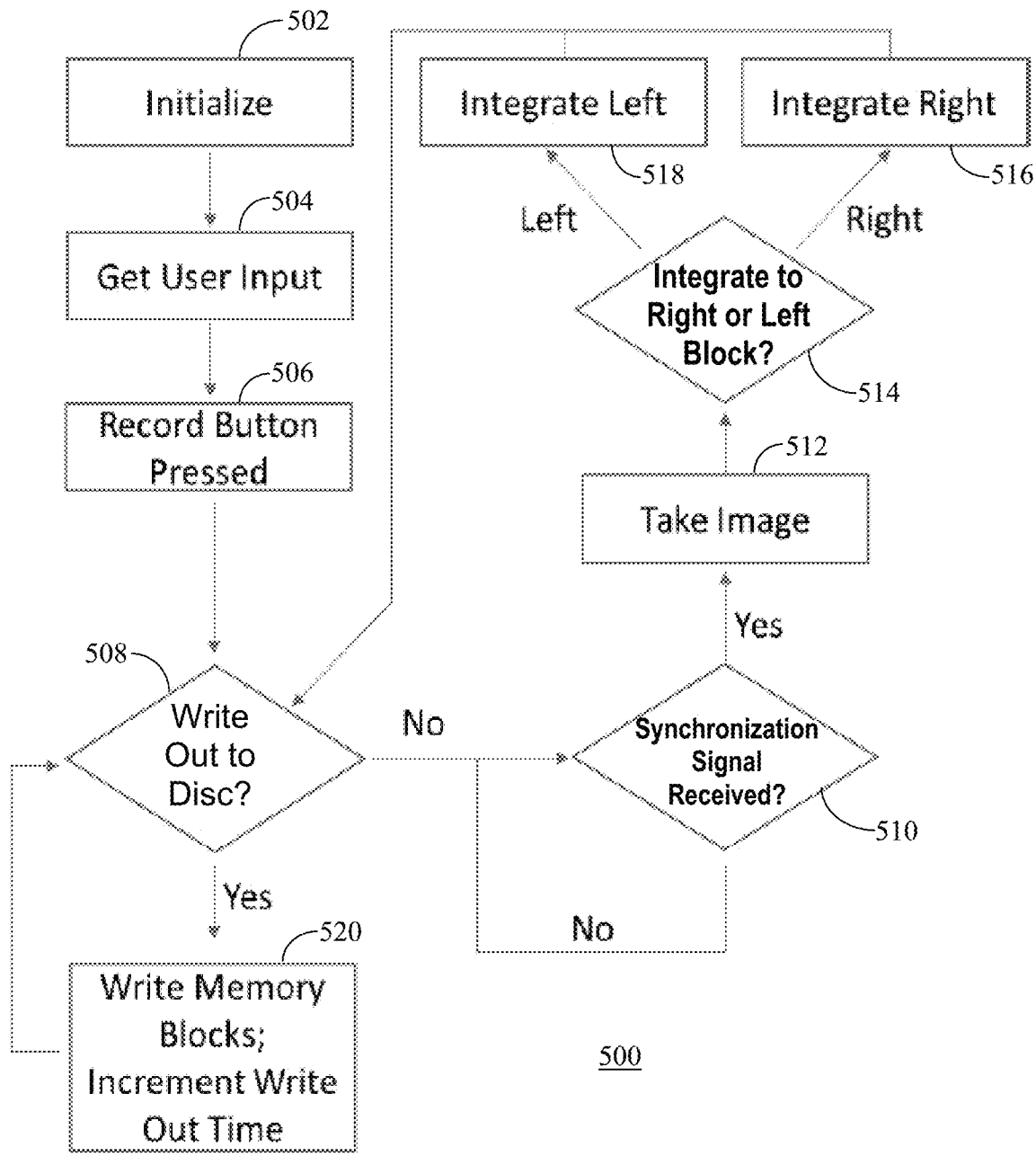
FIG. 5 depicts a flowchart for data acquisition in the imaging precision ellipsometry system in accordance with the present embodiments.

The data acquisition software which enables imaging precision ellipsometry can be written for the computer in any general-purpose programming language. The key feature of the software is that it must acquire image frames in synchrony with the modulator 110, accumulating and saving then in two series of files: one series for the "left" modulation half-period, and the other series for the "right" modulation half-period. In imaging precision ellipsometry in accordance with the present embodiments, the difference between the two series of files is determined at each point in time, thus cancelling out any background noise and extracting the reflected light signal. FIG. 5 depicts a flowchart 500 of the logic underlying the software's operation in accordance with the present embodiments.

The system is initialized at step 502. After user input is received 504 that the system is powered on and the record button on the camera 112 is pressed 506, operation determines whether it is write out time 508 (i.e., time to save 404) or time to record 402. When it is time to record 402, operation awaits reception 510 of the synchronisation signal 142. When the synchronisation signal 142 is received 510, an image is taken 512 and it is determined 514 whether to accumulate 356 the image into the right array 368 or the left array 358. If the image is a right array image 364, it is integrated 516 into the right array 368 and if the image is a left array image 354, it is integrated 518 into the left array 358. This process continues until processing determines 508 that it is time to save 404 the differential signal 374 of the polarisation array 372. When processing determines 508 it is time to save 404, the memory blocks of the differential signal 374 of the polarisation array 372 are written 520 to disc by the computer writing 376 pixel values of the polarisation array 372 to disc. The write out time is then incremented and processing returns to await reception 510 of the next synchronisation signal 142.

Figure 6A:
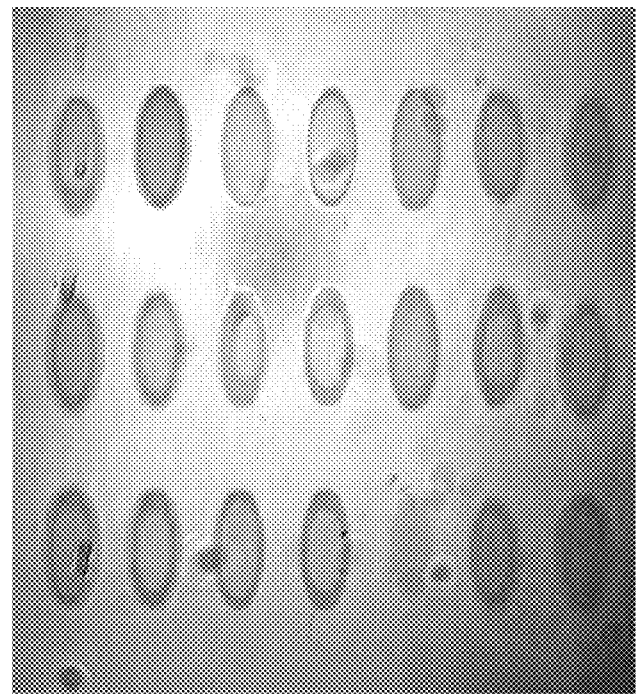
Figure 6B:
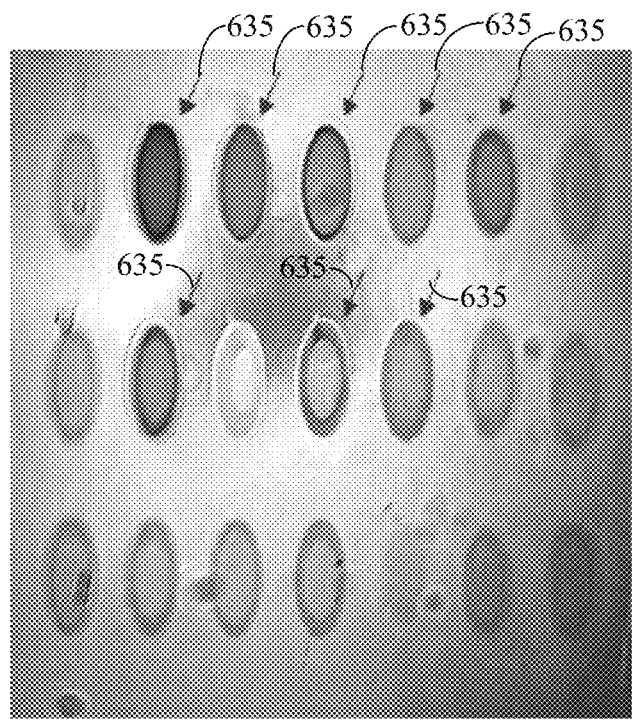

In accordance with the present embodiments, a binding signal can be extracted from any arbitrary area of the sample 108 by opening the image files in an image manipulation programme and defining a region of interest. Referring to FIGS. 6A and 6B, a photographic image 600 (FIG. 6A) shows a printed glycan microarray before hybridization with Aleuria Aurantia Lectin and a photographic image 630 (FIG. 6B) shows a printed glycan microarray after hybridization with Aleuria Aurantia Lectin. The arrows 635 in the image 630 clearly show binding to only some spots but not others.

Figure 6C:
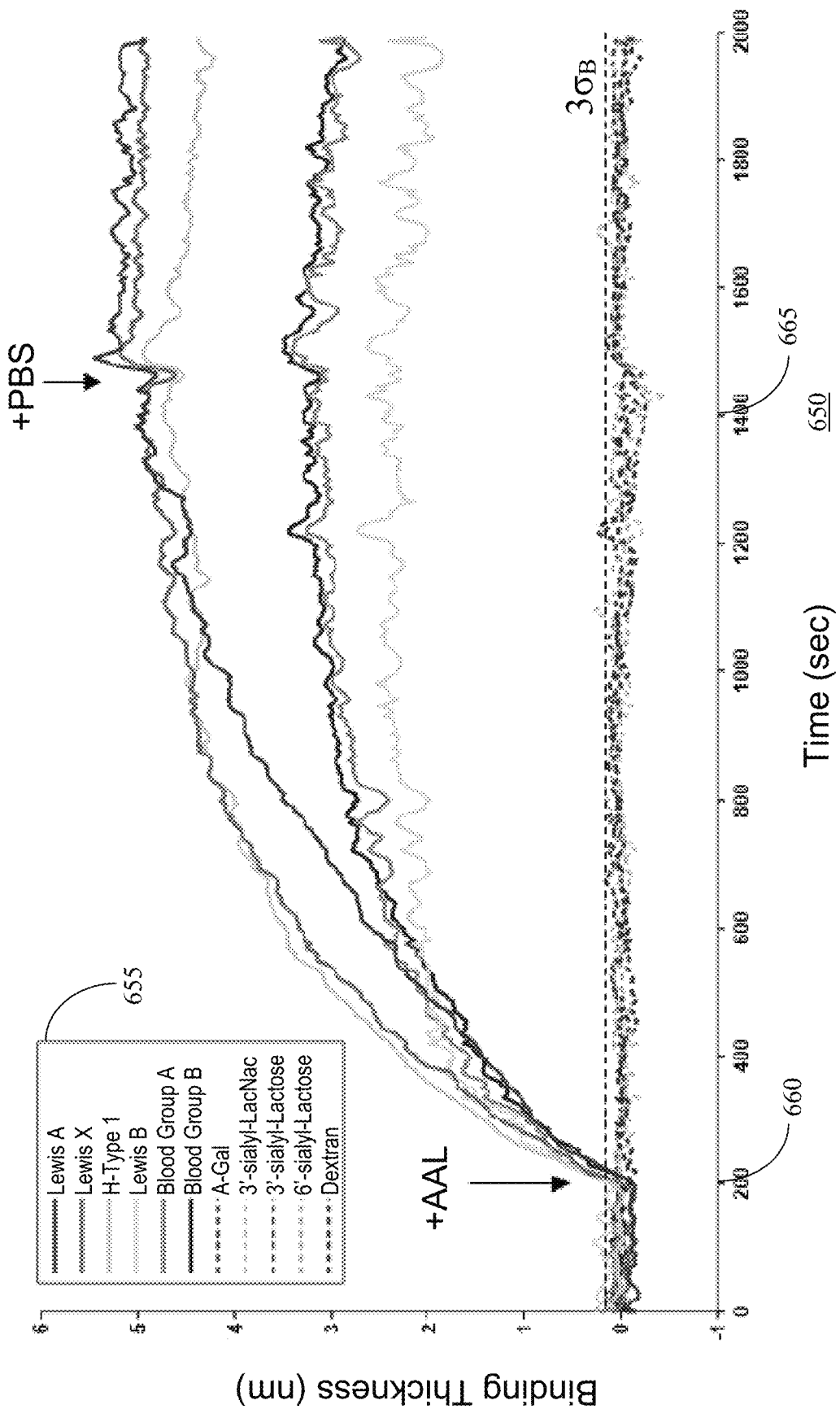

Referring to FIG. 6C, a graph 650 shows binding over time, where the printed glycan microarray consisted of the molecules listed in the legend 655. At two hundred seconds 660, a solution of Aleuria Aurantia Lectin (AAL) was injected. Then, at fourteen hundred seconds 665, the solution was rinsed away by a phosphate buffer saline (PBS). From the graph 650, it can be seen that the AAL was hybridized with the six molecules shown as solid lines (i.e., Lewis A, Lewis X, H-Type 1, Lewis B, Blood Group A, and Blood Group B), while the AAL was not hybridised with the other molecules shown as dashed lines (i.e., A-Gal, 3'-sialyl-LacNac, 3'-sialyl-Lactose, 6'-sialyl-Lactose, Dextran).

To convert the observed change in pixel values to a more generally useful quantity, such as the thickness of attached molecular layers, a simple calibration procedure has been developed. First, the region to be measured (e.g., an entire microarray) is brought into focus as seen in the images 600, 630. Second, the image acquisition programme is provided with the appropriate imaging parameters (gain, shutter, integration time, etc.) that will be used for the experiment. Third, image acquisition is started, and the modulator 110 is then rotated at a steady rate during the acquisition process. This produces data that is mathematically equivalent to the entire region of measurement increasing uniformly in thickness at the same rate. Finally, this data set is opened in an image manipulation programme and the ratio of increment of average pixel value from each region of interest over increment of rotation angle is extracted.

Figure 7:
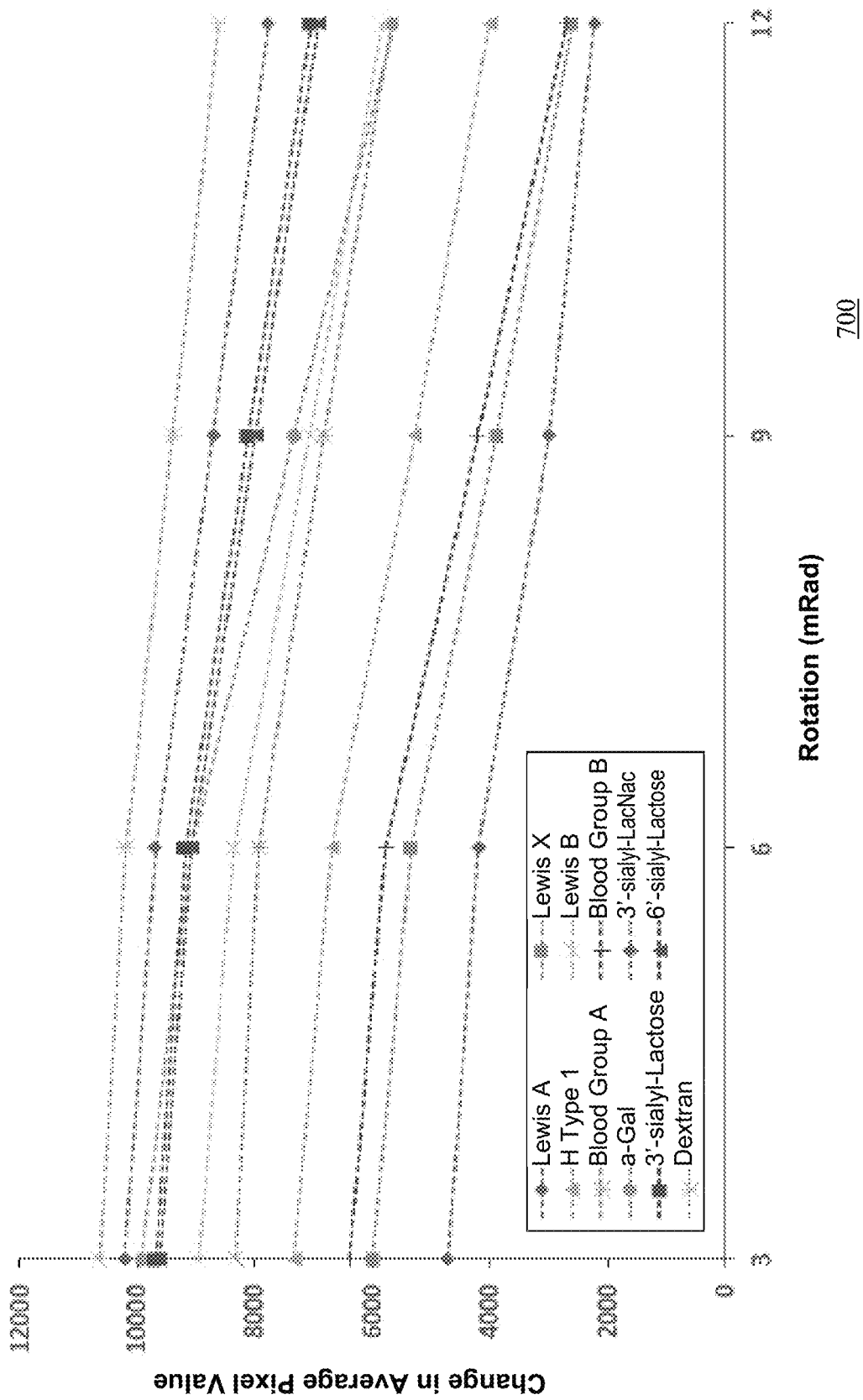
FIG. 7 depicts a graph of calibration data for the imaging precision ellipsometry system in accordance with the present embodiments from regions of interest.

FIG. 7 depicts a graph 700 of calibration data for the imaging precision ellipsometry system in accordance with the present embodiments from the same regions of interest as the graph 650. As can be seen from the graph 700, the resulting calibration data is a series of straight lines, their slopes equal to the ratios of an increment of the average pixel value from each region of interest over an increment of the rotation angle. Converting the angle of polarisation rotation into a sample thickness using conventional ellipsometric formulas, a calibration coefficient from pixel values to sample thickness can be determined, which can then be used to calculate the vertical scale in the graph 650.

Thus, it can be seen that the present embodiments provide systems and methods for imaging precision ellipsometry and differential polarization imaging which provides a low-cost, low-power, light portable device with a smaller footprint than conventional ellipsometry devices for point-of-care (POC) imaging which are sensitive enough to observe the accumulation of single organic molecule layers for real-time, label-free affinity measurements. The single-use silicon oxide substrates are inexpensive in contrast to expensive gold substrates used in surface plasmon resonance (SPR) devices while providing comparable sensitivity to SPR devices. In addition, the single-use silicon oxide substrates eliminate the gold substrate required laborious regeneration procedures between experiments, which procedures are not always successful in removing the previously-bound analyte.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A method for imaging precision ellipsometry of a sample, the method comprising:
    shining a source of linearly polarised light on a surface of the sample, wherein light reflected off the surface of the sample has elliptic polarisation;
    converting polarisation of the light reflected off the surface of the sample into linear polarisation suitable for a polarisation modulator by a retarder;
    oscillating a polarisation modulator to measure the polarisation rotation of the polarised light passing through the retarder;
    synchronising acquisition of images of the light from the retarder with oscillations of the polarisation modulator to acquire first array images during positive half-periods of oscillations of the polarisation modulator and to acquire second array images during negative half-periods of the oscillations of the polarisation modulator; and
    differential image processing of the first array images and the second array images to generate difference images comprising a plurality of pixels, wherein the value of each of the plurality of pixels in each of the difference images is proportional to the polarisation rotation of the light reaching the polarisation modulator from the sample.

2. The method in accordance with claim 1 wherein the step of synchronising acquisition of images of the polarised light with oscillations of the polarisation modulator comprises saving a plurality of first images to generate an accumulated first image and saving a plurality of second images to generate an accumulated second image.

3. The method in accordance with claim 2 wherein the plurality of first images comprise a plurality of right polarisation images of the linearly polarised light, and wherein the plurality of second images comprise a plurality of left polarisation images of the linearly polarised light.

4. The method in accordance with claim 2 wherein the sample comprises a plurality of receptor molecules fashioned as a microarray on the sample, and wherein saving the plurality of first images and the plurality of second images followed by differential image processing of the accumulated first image and the accumulated second image enables simultaneous measurement of molecular attachment on the receptor molecules of the microarray.

5. The method in accordance with claim 3 wherein the synchronising step comprises synchronising acquisition of images recorded by a video camera, the method further comprising transmitting data of the plurality of right polarisation images and the plurality of left polarisation images from the video camera to a computer, wherein the transmitting step is also synchronised with oscillations of the polarisation modulator.

6. The method in accordance with claim 5 wherein the modulator is configured to acquire a first image during a first half-period of oscillation, transmit image data during a full period of oscillation after the first half-period of oscillation, and acquire a second image during a second half-period of oscillation after the full period of oscillation, the second half-period of oscillation having an opposite polarity to the first half-period of oscillation.

7. The method in accordance with claim 1 wherein the thickness of a layer on the substrate is determined from an ellipticity of reflected light determined from rotation of polarisation of light passing through the retarder, where the rotation is measured using a polarisation modulator.

8. The method in accordance with claim 1 wherein the step of illumination of the surface of the sample comprises directing a rastered laser beam of linearly polarised light onto the surface of the sample.

9. The method in accordance with claim 8 wherein the step of directing a rastered laser beam of linear polarised light comprises rastering a laser beam in a first direction and rastering the laser beam in a second direction to generate the rastered area of linearly polarised light, wherein the first direction is perpendicular to the second direction.

10. A method for imaging ellipsometry comprising:
generating a laser beam;
rastering the laser beam in a first direction and rastering the laser beam in a second direction to generate a rastered laser beam of linearly polarised light, wherein the first direction is perpendicular to the second direction; and
directing the rastered laser beam of linearly polarised light onto a surface of a sample to reflect elliptically polarised light off the surface of the sample for imaging ellipsometry of the sample.

11. An imaging ellipsometry system for generating a polarisation image in response to elliptically polarised light reflected off a surface of a sample, the system comprising:
an illumination system generating linearly polarised light and directing the linearly polarised light onto the surface of the sample;
a quarter wavelength retarder converting reflected elliptically polarised light into linearly polarised light having a direction of polarisation rotated by an angle proportional to an ellipticity of the reflected light;
a polarisation modulator generating an oscillating component of an intensity of the reflected light, wherein a difference between intensities of the reflected light during a first half-period of the oscillation and during a second half-period of the oscillation depends on a direction of polarisation of light passing through the retarder;
an imaging device imaging an illuminated area of the surface of the sample using reflected light;
a synchronising circuit coupled to the imaging device and the polarisation modulator and synchronising imaging of the reflected linear polarised light with oscillations of the polarisation modulator to image first and second array images; and
a computer coupled to the imaging device for differential imaging processing of the first and second array images to generate a polarisation image comprising a plurality of pixels, wherein a value of each of the plurality of pixels of the polarisation image is proportional to the ellipticity of the reflected light.

12. The system in accordance with claim 11 wherein the imaging device is a digital video camera.

13. The system in accordance with either claim 11 or claim 12 wherein the retarder is a quarter wave phase shift plate.

14. The system in accordance with claim 11 further comprising an opto-fluidic cuvette within which the sample is placed, wherein the illumination system directs the linear polarised light onto the surface of the sample within the opto-fluidic cuvette.

15. The system in accordance with claim 11 wherein the computer saves a plurality of first images to generate an accumulated first image and saves a plurality of second images to generate an accumulated second image.

16. The system in accordance with claim 15 wherein the computer subtracts the accumulated first image from the accumulated second image.

17. The system in accordance with claim 15 wherein the computer saves the plurality of first images and the plurality of second images and subtracts the accumulated first image from the accumulated second image to enable simultaneous measurement of molecular attachment on each of a plurality of receptor molecules fashioned as a microarray on the sample.

18. The system in accordance with claim 12 wherein the computer further stores the polarisation image in synchronisation with the synchronising circuit controlling oscillations of the polarisation modulator.

19. The system in accordance with claim 11 wherein the illumination system comprises a device for rastering a laser beam of linearly polarised light over the surface of the sample to generate a rastered area on the surface of the sample.

20. The system in accordance with claim 19 wherein the rastered laser beam comprises:
a laser for generating a laser beam; and
a laser beam rastering device for rastering the laser beam in a first direction and rastering the laser beam in a second direction to generate the rastered laser beam of linear polarised light, wherein the first direction is perpendicular to the second direction.

21. An imaging ellipsometry system for generating a polarisation image in response to linear polarised light reflected off a surface of a sample, the system comprising:
a laser for generating a laser beam; and
a laser beam rastering device rastering the laser beam in a first direction and rastering the laser beam in a second direction to generate a rastered laser beam of linear polarised light, wherein the first direction is perpendicular to the second direction, wherein the laser beam rastering device further directs the rastered laser beam of linear polarised light onto a surface of a sample to reflect elliptically polarised light off the surface of the sample for imaging ellipsometry of the sample.

\* \* \* \* \*